July 7, 1970 I. DORROS ET AL 3,519,744

APPARATUS FOR CONNECTING VISUAL TELEPHONE SETS IN A CONFERENCE ARRANGEMENT

Filed June 16, 1967 6 Sheets-Sheet 1

INVENTORS I. DORROS
D. B. ROBINSON, JR.
BY Daniel D. Dubosky
ATTORNEY

July 7, 1970 I. DORROS ET AL 3,519,744

APPARATUS FOR CONNECTING VISUAL TELEPHONE SETS IN A CONFERENCE ARRANGEMENT

Filed June 16, 1967 6 Sheets-Sheet 2

United States Patent Office 3,519,744

Patented July 7, 1970

3,519,744
APPARATUS FOR CONNECTING VISUAL TELEPHONE SETS IN A CONFERENCE ARRANGEMENT

Irwin Dorros, Fair Haven, and Dudley B. Robinson, Jr., Madison, N.J., assignors to Bell Telephone Laboratories, Incorporated, Murray Hill and Berkeley Heights, N.J., a corporation of New York Filed June 16, 1967, Ser. No. 646,525
Int. Cl. H04m *11/06*
U.S. Cl. 179—2 11 Claims

ABSTRACT OF THE DISCLOSURE

The video signals from visual telephone sets in several remote locations are distributed to the video receivers in the several visual telephone sets by a plurality of video switches located in a central location. Each video switch connects its corresponding video receiver through to one of the video signals generated in one of the other remote locations. Each video switch consists of a number of contacts which are activated by two relays which in turn may be controlled in either of two ways. First, the viewer in any one of the locations may permit his two relays to be automatically controlled by apparatus which detects the presence of a speech signal from any one of the remote locations, and in response to this detection, causes his video receiver to be connected through to the video signal generated in the speaker's location providing the viewer is not also the speaker. The relays of the speaker's video switch are maintained by the speech detecting apparatus in the same state of energization which existed prior to the generation of speech energy. In other words, the speaker's video receiver remains connected to the same video signal even after he begins to speak. Alternatively, the two relays corresponding to any one of the video switches may be connected to be energized by the contacts of two other relays which are directly under the control of the viewer in his remote location. As a result, any viewer may connect his video receiver to the video signal generated in any one of the other remote locations irrespective of which viewer is speaking.

BACKGROUND OF THE INVENTION

This invention relates to visual telephone systems and more particularly to a system for connecting visual telephone sets in a conference arrangement for parties who are situated at more than two locations.

Visual telephone systems presently provide communications between two locations. With the use of wide-angle lenses at one or both of these locations, a conference can be provided for more than two individuals. The parties to the conference, however, must still be at no more than two locations. With business locations and families scattered throughout the country, it would be highly desirable to provide a conference visual telephone system which would permit the parties to a conference to be situated at more than two locations.

Present-day commercial television has, at times, provided programs which contain discussions between parties located in several locations. During some of these programs, a technician manually switches between the participants of the conference in order to always display to the viewing audience the person who is talking at any particular time. Still another provision for multiparty discussions utilized on present-day commercial television has involved the use of split-screen techniques whereby the several participants of the conference are shown in different areas of the viewing screen. If conferring by way of visual telephone is to be at all possible economically, the luxury of manual switching by a viedo technician will not be permitted. In addition, the viewing screen on a visual telephone set is not large enough to permit the several participants in a multiparty conference to be displayed on their individual sectionalized area of the viewing screen, and unsynchronized pictures originating in different remote locations would be difficult to display on a split screen.

Accordingly, a primary object of the present invention is to provide a conference system between parties at more than two locations using a visual telephone system wherein the talking party is displayed on the entire viewing screen of the visual telephone sets of the remaining participants.

It is a feature of the present invention to automatically switch the video receiver of each participant to view the party who is presently talking.

Still another feature of the present invention is to provide each participant with a manual selection device whereby the automatic switching feature can be disconnected and the viewer can observe a party other than the party who is presently speaking.

Still another feature of the present invention is the automatic provision of the speaker with a picture of the participant in the conference who spoke before him unless the speaker chooses to manually select another participant.

SUMMARY OF THE INVENTION

These objects and other advantages are obtained in apparatus built in accordance with the present invention wherein the video signals from a plurality of visual telephone sets in remote locations are distributed by a plurality of video switches, one for each location, to the video receivers in each of the visual telephone sets. Each video switch connects its corresponding video receiver to the video signal generated in one of the other locations in response to a signal applied to the control input of the video switch. In accordance with one aspect of the present invention, the control signals for each video switch are generated by an apparatus which detects which one of the remote locations is generating a speech signal and in response to this information connects the video receivers in all other locations to the video signal generated in the speaker's location. The video receiver in the speaker's location remains connected to the same video signal to which it was connected prior to the detection of speech. In accordance with a second aspect of the present invention, the control input of any one video switch may be disconnected from the automatic control provided by the speech detection apparatus and instead be connected to control signals provided from a manual selection device in its corresponding remote location. As a result, the video receiver in any one of the remote locations may be disconnected from the automatic control and instead be connected by means of the manual selector to any one of the video signals generated in any one of the other locations irrespective of which location is generating the speech signal.

BRIEF DESCRIPTION OF THE DRAWING

The invention will be more fully understood after a reading of the following detailed description in conjunction with the accompanying drawings, in which.

DESCRIPTION

Figure 1:
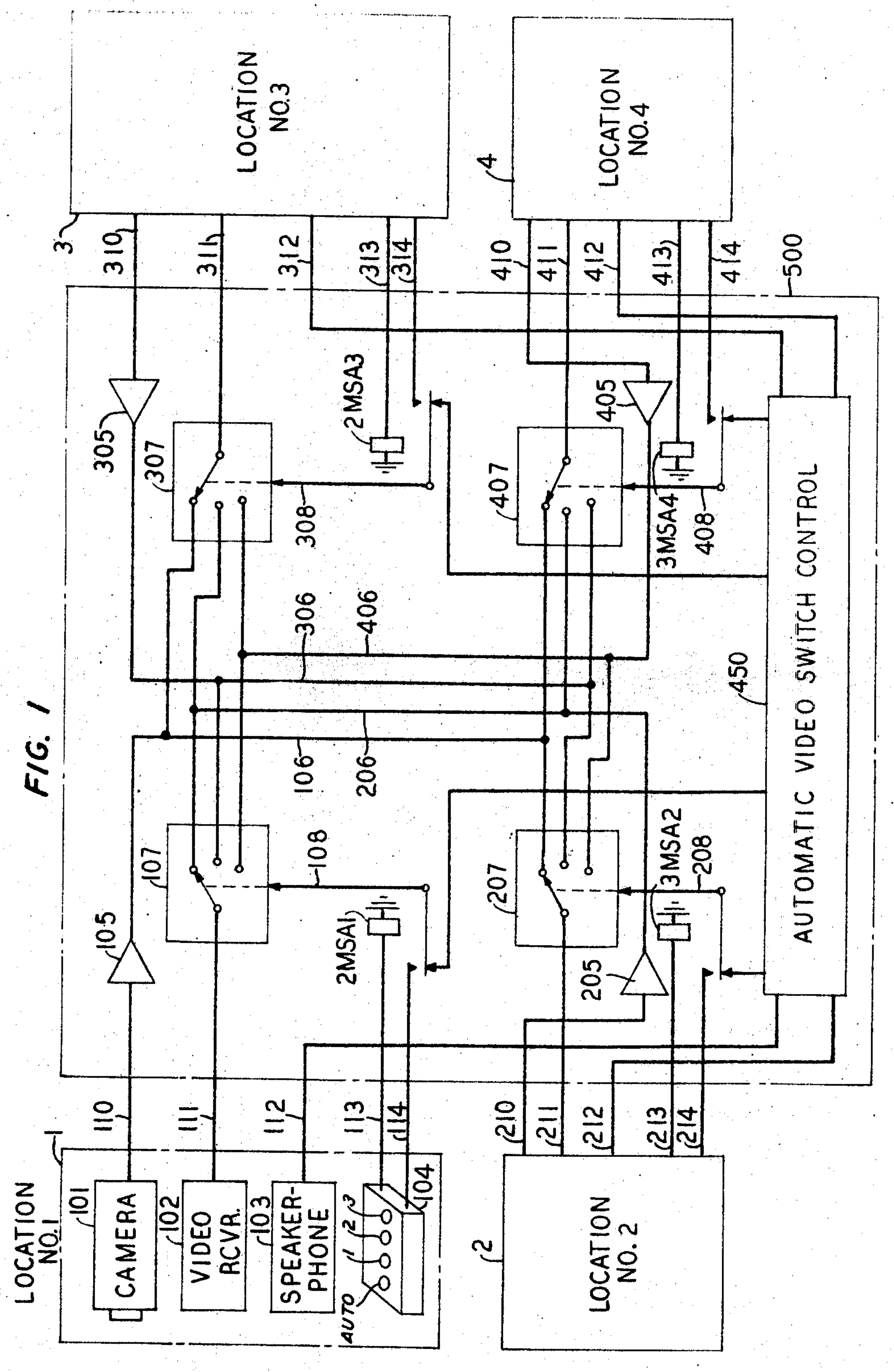
FIG. 1 is a block diagram of a visual telephone conference system constructed in accordance with the present invention.

In FIG. 1, the block diagram of a conference system for visual telephone sets at four different locations is shown. The apparatus at each of the four remote locations is indicated by a rectangle designated in FIG. 1 by the numbers 1, 2, 3 and 4 respectively. Each location has a camera for generating video signals in response to the view which is presented to the camera lens, a receiver for displaying a visual presentation of the video signal received at this location, a speaker phone for transmitting and receiving the speech signals at the location, and a manual selection device for selecting the type of operation which is to take place at each individual location. Each of these apparatus types is identical in each of the four locations and they are shown in FIG. 1 for location 1 only in order to present a more compact block diagram of the essential parts of the present invention.

Video signals generated at each of the locations 1, 2, 3 and 4 by their respective cameras are connected to a central location 500 by transmission paths 110, 210, 310 and 410. At central location 500, the transmitted video signals from locations 1, 2, 3 and 4 are amplified by amplifiers 105, 205, 305 and 405 respectively and connected to a distribution grid formed by transmission paths 106, 206, 306 and 406, each path containing only the video signal from the location indicated by the hundreds digit in its designating number. The video receivers in locations 1, 2, 3 and 4 are connected to central location 500 by transmission paths 111, 211, 311 and 411 respectively. The particular video signal transmitted over these paths to any one video receiver is determined by the position of a video switching network shown in FIG. 1 in symbolic form as a single pole multijunction switch and identified for each of the four locations as 107, 207, 307 and 407. The video signal which is coupled to a video receiver in any particular location is dependent on the position of its respective video switch; for example, the video signal connected by way of transmission path 111 to video receiver 102 is determined by the position of video switch 107. As shown in FIG. 1, video switch 107 may connect transmission path 111 selectively to transmission paths 206, 306 or 406, that is, to the video signal generated in any one of the other locations. Control of each of the video switches 107, 207, 307 and 407 is determined by the signals applied to their control inputs designated in FIG. 1 as 108, 208, 308 and 408, respectively.

The speech signals connected to and from each of the four locations over transmission paths 112, 212, 312 and 412 are connected in central location 500 to an automatic video switch control 450. During normal automatic operation, the automatic video switch control 450 provides signals at its outputs to each of the control inputs 108, 208, 308 and 408 of their respective video switches 107, 207, 307 and 407. Functionally, the automatic video switch control 450 detects which one of the four locations is generating speech information and in response to this information connects the video receivers in the other locations to the transmission path containing the video signal from the speaker's location. The speaker's video receiver remains connected to the video transmission path corresponding to the previous speaker. For example, in FIG. 1 with the video switches 107, 207, 307 and 407 in their positions as shown, video receiver 102 in location 1 receives a video signal on transmission path 111 through video switch 107 from transmission path 206 which contains, as pointed out hereinabove, the video signal from the camera in location 2. The other video switches 207, 307 and 407, however, are shown in positions whereby their transmission paths to the receivers in their respective locations are provided with the video signal on transmission path 106 containing the video information from camera 101 in location 1. These positions as shown would correspond to a situation for which the person in location 1 is presently speaking and generating speech information over transmission path 112 and the previous speaker was the participant in location 2. If now the speaker at location 1 ends his conversation, and in response to his statements the speaker in location 2 begins his conversation, speech signals from the speakerphone in location 2 coupled by way of transmission path 212 to central location 500 cause the automatic video switch control 450 to generate signals at the control inputs 108, 308 and 408 which cause video switches 107, 307 and 407 to couple their respective video receivers to transmission path 206 containing the video signal from the camera in location 2. In the case of video switch 207, however, automatic video switch control 450, in a manner to be described more completely hereinafter in the detailed description, continues to provide a video signal to the receiver in location 2 over transmission path 211 from transmission path 106 containing the video information from camera 101 in location 1.

In summary, under normal automatic operation, the automatic video switch control 450 by detecting speech signals on the incoming speech transmission paths determines which of the four locations has an individual who is presently speaking and a response to this information connects all of the video receivers except the one in the speaker's location to the video signal generated by the speaker's camera. The speaker's video receiver, however, remains connected to the transmission path corresponding to that of the previous speaker's camera.

The automatic operation described hereinabove works well in the situation where the speaker wishes to observe the person who has previously spoken. In most situations where the present speaker is answering a question or commenting on a statement made by the previous speaker, this automatic method of operation provides the present speaker with the desired view on his video receiver. At some points in a conversation however, the speaker may not wish to respond to a person who has previously spoken but may wish to direct his questions or statements to another participant in the conference; or, in still other situations, a participant in one location may wish to observe the reactions of another participant in the conference who is not presently speaking. For example, in a conference between the President, Secretary of State, and Secretary of Defense, the Secretary of State may very likely wish to observe the President, while the Secretary of Defense is presenting his solution to a particular problem under discussion rather than observing the Secretary of Defense who is speaking. In these situations, the automatic control provided by automatic video switch control 450 will not provide the participant in the conference with an image on his video receiver of the particular participant whom he wishes to observe.

Advantageously, the instant invention provides apparatus to disconnect the control signal provided by automatic video switch control 450 from any one of the control inputs 108, 208, 308 and 408. As shown in FIG. 1, the control signal from automatic video switch control 450 is connected to the control inputs 108, 208, 308 and 408 through the normally closed contacts of relays 2MSA1, 3MSA2, 2MSA3, and 3MSA4 respectively. Throughout the instant specification, the first number in each relay designation indicates the figure of the detailed schematic drawing where the relay coil is located, the letters following the first number designate the relay type according to the function it performs, and the last number in the designation indicates the number of the video switch and location of the video receiver affected by the operation of the relay. Each contact in the specification is designated by two parts separated by a dash, the first part being identical to the relay coil which operates the contact, and the second part being an arbitrary number used to distinguish one contact from another operated by the same relay. The coil of each MSA relay is connected to its corresponding location through the transmission paths shown in FIG. 1, as 113, 213, 313 and 413 to a manual selection device shown in FIG. 1 for location 1 only as manual selection device 104. Application of an energizing potential to any one of these transmission paths 113, 213, 313 or 413 causes operation of the corresponding relay which in turn disconnects the control input of the corresponding video switch from the anutomatic video switch control 450 and connects the control input to a second transmission path, 114, 214, 314 or 414, connected between the manual selection device in each location and the central location 500. Hence, after any one of the MSA relays is energized, the participant in the conference at that location may apply the appropriate potentials through this second path to the control input of his corresponding video switch. In this way, the participant at any one location may disconnect his video switch from the automatic control provided by automatic video switch control 450 and instead operate his video switch so as to connect his video receiver to any one of the video signals originating in any one of the other three locations irrespective of which one of the participants happens to be speaking at that instant.

DETAILED DESCRIPTION

Figure 2:
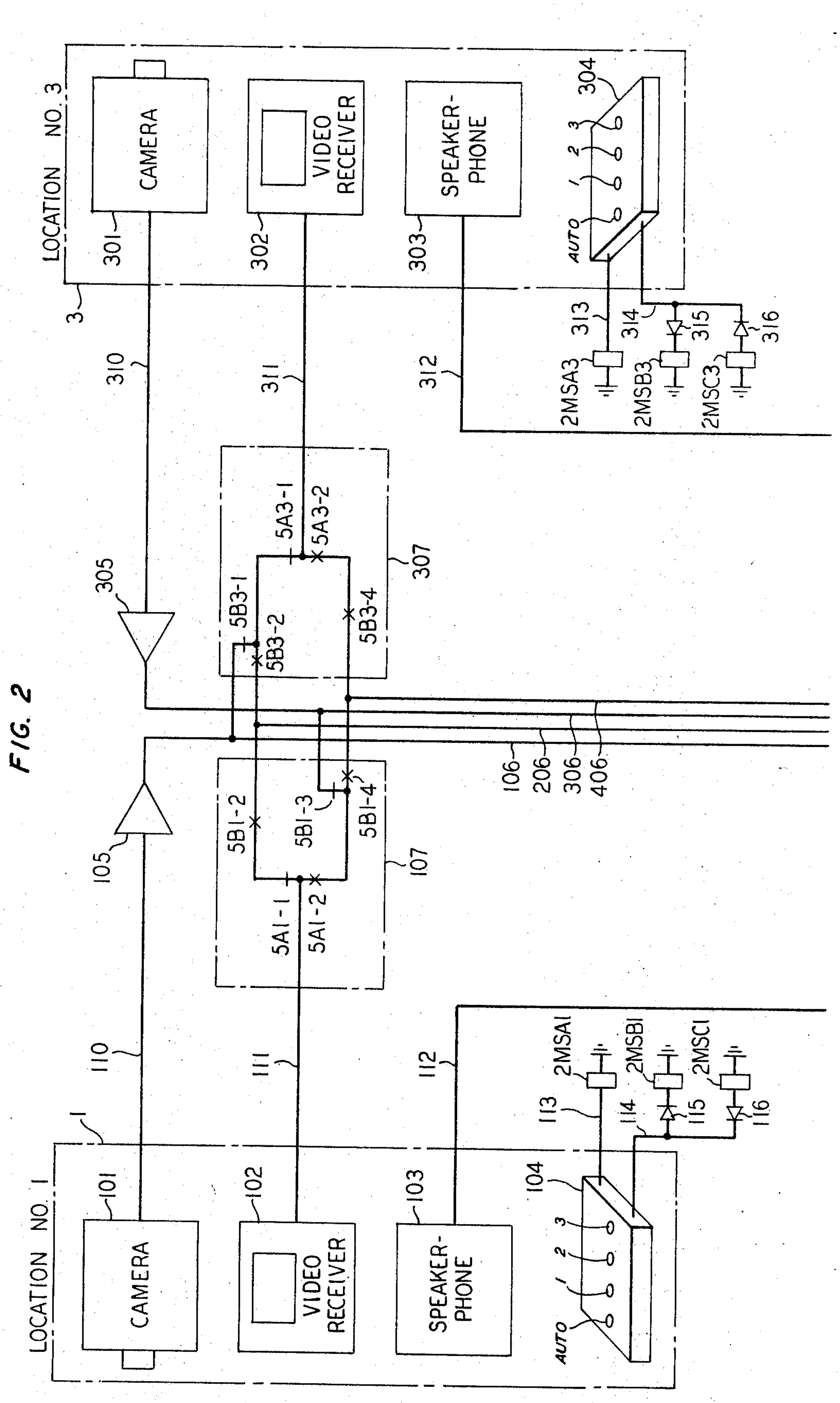
FIGS. 2, 3, 4 and 5 when arranged as shown in FIG. 7 constitute a detailed schematic block diagram of the system shown in block-diagram form in FIG. 1.
Figure 3:
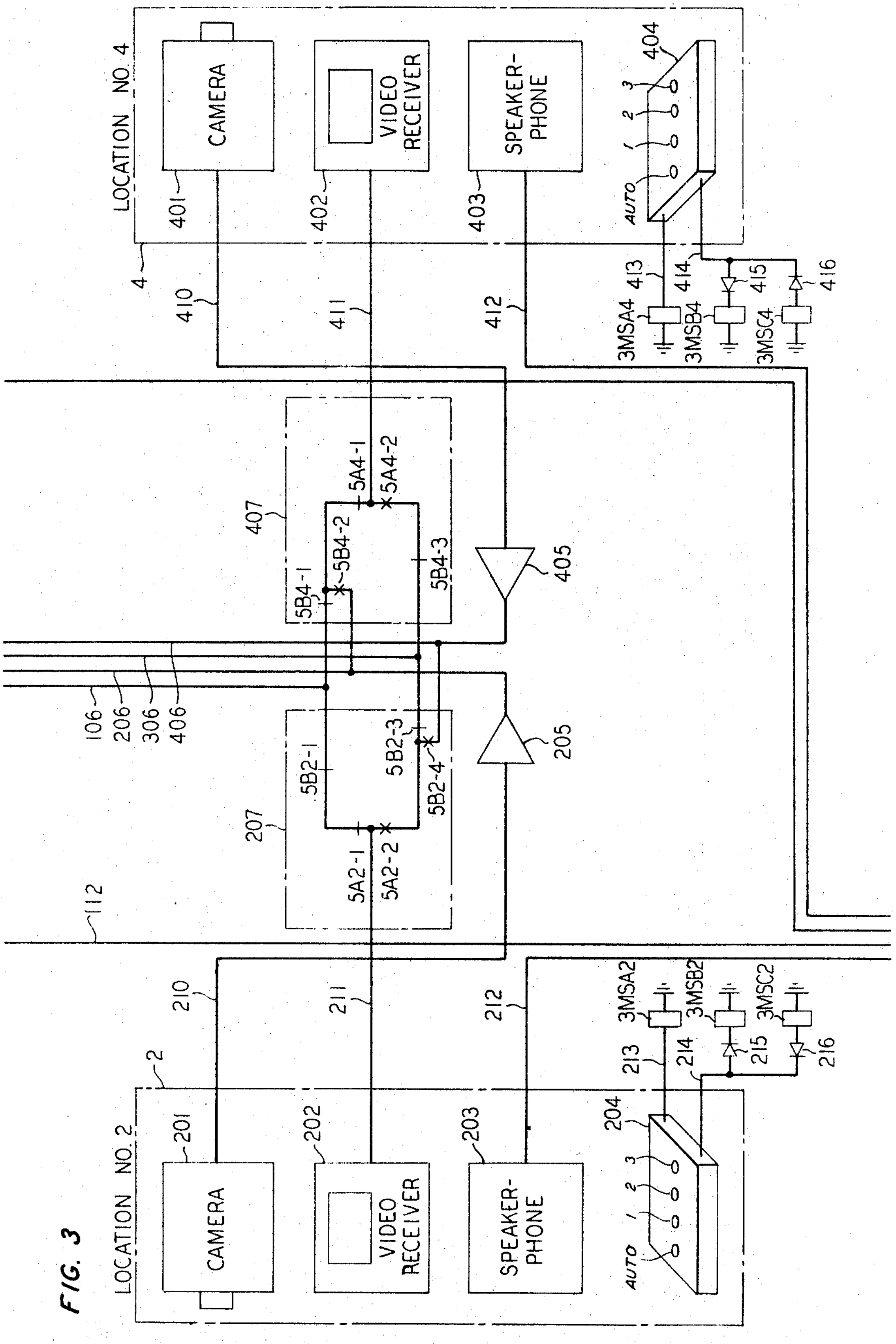
Figure 7:
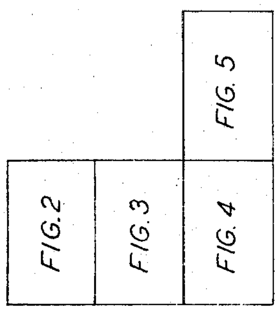

Arrangement of FIGS. 2, 3, 4 and 5 in accordance with the illustration shown in FIG. 7 provides a detailed schematic block diagram of the apparatus shown in FIG. 1. In FIGS. 2 and 3 each of the four locations 1, 2, 3 and 4 are shown to contain a camera, video receiver, speakerphone, and manual selection device. Each of these apparatus types are identical and are designated in FIGS. 2 and 3 with similar numbers differing only in the hundreds digit which provides an indication as to the location in which the individual apparatus is located. Transmission paths and apparatus which perform in identically the same way as described hereinabove in connection with FIG. 1 have been provided with identical numbers.

The video signals generated by the cameras in locations 1, 2, 3 and 4 are connected by way of transmission paths 110, 210, 310 and 410 respectively through amplifiers 105, 205, 305 and 405 to a transmission grid composed of paths 106, 206, 306 and 406, each one of which contains the video signal generated only in the location corresponding to their hundreds digit. The video switches which were shown symbolically in FIG. 1 as a single pole multiple-position switch each appear in FIG. 2 and 3 as a plurality of contacts arranged in a form known in network topology as a tree. The video receivers in locations 1, 2, 3 and 4 are connected through transmission paths 111, 211, 311 and 411 respectively to the outputs of their respective video switches. By operation of the relays which control the contacts in each video switch, each video receiver may be connected singularly to any three of the four transmission paths 106, 206, 306 and 406 containing the video signals generated in the other three locations.

The speech signals from each of the speakerphones in the four locations are coupled by way of transmission paths 112, 212, 312 and 412 to the inputs of hybrids 451, 452, 453 and 454 respectively. Each hybrid couples the incoming speech from its corresponding location through one of the amplifiers 461, 462, 463 and 464 to a mixing network 460. From the mixing network 460 the speech signal is coupled back through one of the transmission amplifiers 455, 456, 457 and 458 to the hybrids, and through the transmission paths 112, 212, 312 and 412 to the individual locations. The mixing network 460, the hybrids and the transmission amplifiers which couple the hybrids to the mixing network form a well-known toll conferencing bridge which is provided at any location where it is desired to connect more than two parties into a conference arrangement without loading down any one of the parties' transmitters.

The speech signal received from each of the four locations in addition to being coupled to the mixing network 460 is also coupled through one of the transmission amplifiers 465, 466, 467 and 468 to the input of one of the speech detectors 471, 472, 473 and 474. Amplifiers 465 through 468 serve to isolate the speech detectors from the hybrid circuits so as to prevent the speech detectors from loading the circuits associated with the toll conferencing bridge. Appearance of a speech signal at the input of any one of the speech detectors causes that detector circuit to produce a voltage pulse at its output. The voltage pulses from speech detectors 471, 472, 473 and 474 are each connected to one input of Inhibit gates 475, 476, 477 and 478 respectively, each of which has three other inhibit inputs. Providing an energizing signal is not provided to any one of the inhibit inputs, the voltage presented to any one of the Inhibit gates is connected through to the Set input of one of the bistable devices 481, 482, 483 and 484.

Appearance of a voltage pulse at the Set input of any one of the bistable devices causes that bistable device to generate a voltage at its output corresponding to a logical "1." Each bistable device has its output connected to one input of OR gate 490, and to the input of one of the memory cells 485, 486, 487 and 488. The change from a logical "0" to a logical "1" at the output of any one of the bistable devices causes OR gate 490 to produce an output which triggers both a time delayed multivibrator 491 and a pulse generator 492 into operation. Pulse generator 492 substantially instantaneously produces an output pulse which is coupled through a delay network 493 to the read inputs of the memory cells 485 through 488, thereby causing each memory cell to read and store the information presented to its input by one of the bistable devices. Delay network 493 provides a very short delay, only sufficient in duration to insure that all of the bistable devices 481 through 484 have been given sufficient time to operate and achieve their final states before the memory cells are caused to read. The time delay multivibrator 491, on the other hand, does not produce an output instantaneously and thereby energize the reset input of all of the bistable devices 481 through 484, until a predetermined interval after the energizing pulse has appeared at the output of OR gate 490. In practice, a predetermined interval between 100 and 500 milliseconds has been found to be desirable for the time delay in multivibrator 491. To achieve optimum results by experimentation, time delay multivibrator 491 was provided with variable elements which may be changed in order to obtain any one predetermined interval of delay within the range of 100 to 500 milliseconds.

In addition to being connected to OR gate 490 and the input of a memory cell, the output of each bistable device is connected to one inhibit input on each of the three Inhibit gates other than the one which provides the energizing voltage pulse to its Set input. As a result, the first party who speaks will cause his speech detector to energize one of the bistable devices which in turn will inhibit the three Inhibit gates corresponding to the other three locations. In this way the first party who speaks will determine the output condition of the bistable devices, only one of which provides a logical "1" output, and will continue to control this state in the bistable devices until a reset voltage is provided by the time delay multivibrator 491 to the reset inputs of the bistable devices. As will be better appreciated after the complete system is described, the predetermined time delay of 100 to 500 milliseconds provided by time delay multivibrator 491 insures that the individual who is speaking will have his video signal displayed on the other receivers for at least that duration of time and consequently erratic switching from one video signal to another will thereby be prevented.

Even after the 100 to 500 milliseconds, a party who continues to speak will maintain control of the logical circuit involving bistable devices 481 through 484 and Inhibit gates 475 through 478 if the speakerphones used are of the type described in Pat. 3,171,901 of Mar. 2, 1965, to W. F. Clemency et al. In such speakerphones, the transmitting path in all speakerphones except the one presently transmitting are desensitized by variolosser circuits which respond to the incoming speech signals.

Since time delay multivibrator 491 and pulse generator 492 respond only to changes at their inputs which correspond to the change from a logical "0" to a logical "1" at the output of the bistable devices, the memory cells 485 through 488 will maintain the stored information provided by bistable devices 481 through 484 until the bistable device which produced the logical "1" output is reset to "0" and a different one of the other three bistable devices is energized by an output from its corresponding speech detector.

Figure 5:
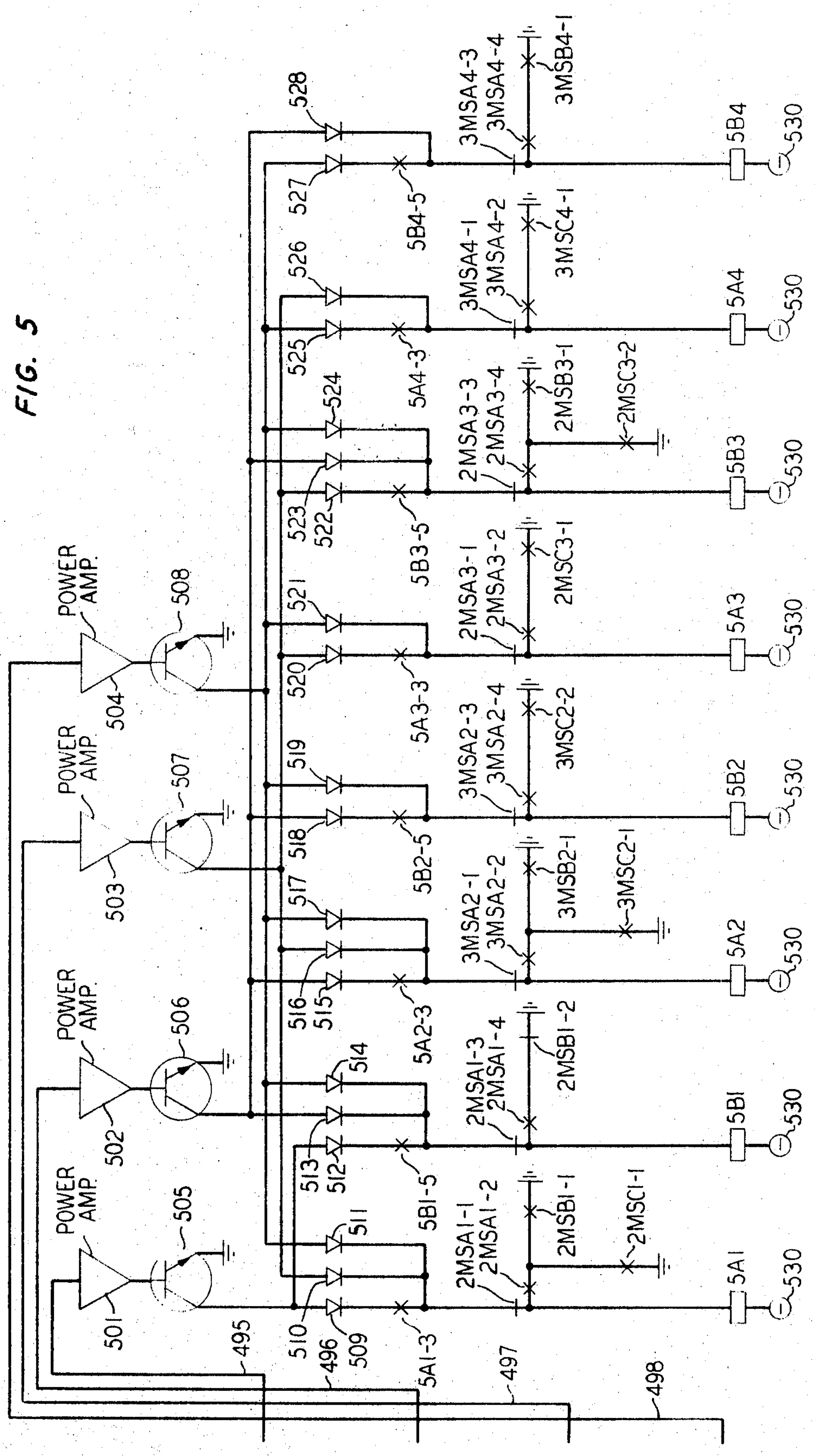

The outputs of memory cells 485 through 488 are connected by way of lines 495 through 498 to the inputs of power amplifiers 501, 502, 503 and 504 respectively. The presence of a logical "1" in any one of the memory cells causes the power amplifier to which it is connected to be energized. The outputs of power amplifiers 501 through 504 are connected to the bases of transistors 505 through 508. Energizing any one of the power amplifiers causes the base-emitter junction of the transistor connected to its output to be forward biased thereby driving the transistor into conduction and causing a very low impedance (compared with the 5A and 5B relay coils to be described hereinafter) to be presented between the collector and emitter of the corresponding transistor. In FIG. 5 each of the transistors 505 through 508 operates as a transistor switch which when energized connects ground potential through to the anodes of the diodes connected to the transistor collectors.

Since only one of the bistable devices 481 through 484 may present a logical "1" at its output at any given instant, only one of the memory cells 485 through 488 may store a logical "1," and therefore only one of the transistors 505 through 508 will be energized during any given instant. Transistor 505 in conduction corresponds to the situation in which an individual in location 1 has spoke before the individuals in any of the other locations and therefore has generated a voltage pulse at the output of speech detector 471 which sets bistable device 481, thereby inhibiting the setting of any of the other bistable devices 482 through 484 at least for the predetermined interval of time corresponding to time delayed multivibrator 491. Similarly, transistor 506 in conduction corresponds to the situation where the speaker in location 2 is in control of the logical circuit shown in FIG. 4 and transistors 507 and 508 correspond to the situation where the speakers in locations 3 and 4, respectively, are in control of the logical circuit shown in FIG. 4.

With transistor 505 in conduction ground potential is connected to the anodes of diodes 509 and 512. If relay 5A1 had been previously energized at the time that transistor 505 is driven into conduction, contact 5A1–3 will be closed and therefore relay 5A1 will be maintained in its energized state by the path provided from ground through transistor 505 through diode 509, normally open contact 5A1–3 and normally closed contact 2MSA1–1. Similarly, if relay 5B1 had been energized immediately prior to the energization of transistor 505, normally open contact 5B1–5 will be closed and therefore a path will be provided from ground through transistor 505, through diode 512, through contact 5B1–5 and normally contact 2MSA1–3. If, however, either one of the relays 5A1 or 5B1 was not energized immediately prior to the instant when transistor 505 is energized, neither relay will, of course, be effected by the energization of transistor 505.

Prior to the instant when transistor 505 is energized, relays 5A1 and 5B1 may have been energized through the path provided by one of the diodes 510, 511, 513 or 514. Even though this latter energizing path may not be provided for a short interval of time during which the conduction is being transferred from one of the other transistors to transistor 505, this short interval of time is insufficient, however, to permit the contacts associated with relays 5A1 and 5B1 to operate, and therefore if relay 5A1 or 5B1 had been operated the contacts associated with these relays 5A1–3 and 5B1–5 will remain closed for a sufficient interval such that transistor 505 can assume control of the respective relay. Hence, relays 5A1 and 5B1 will be maintained in whatever state they had prior to the energizing of transistor 505. Transistor 505 has no effect on any of the other relays 5A2, 5B2, 5A3, 5B3, 5A4 or 5B4 shown in FIG. 5.

In FIGS. 2 and 3 it can be seen that relays 5A1 and 5B1 control only those contacts which are contained in the video switch associated with the video receiver in location 1. All other video switches associated with the video receivers in the other locations are controlled by relays other than 5A1 and 5B1. Hence, with transistor 505 energized, video receivers 202, 302 and 402 will be connected through their video switches through the path provided by the normally closed contacts. Hence, the video signal presented to video receiver 202 in location 2 from path 211 is provided through normally closed contacts 5A2–1 and 5B2–1 from transmission path 106 which, as indicated hereinabove, contains the video signal generated by the camera in location 1. Video receiver 302 in location 3 is similarly connected through normally closed contacts 5B3–1 and 5A3–1 to transmission path 106, and video receiver 402 is also connected through normally closed contacts 5A4–1 and 5B4–1 to transmission path 106. Hence, the video receivers in locations 2, 3 and 4 are connected to the video signal generated by the camera in location 1, whereas the video receiver 102 in location 1 will remain connected to whatever video signal it was connected to prior to the energizing of transistor 505.

Figure 4:
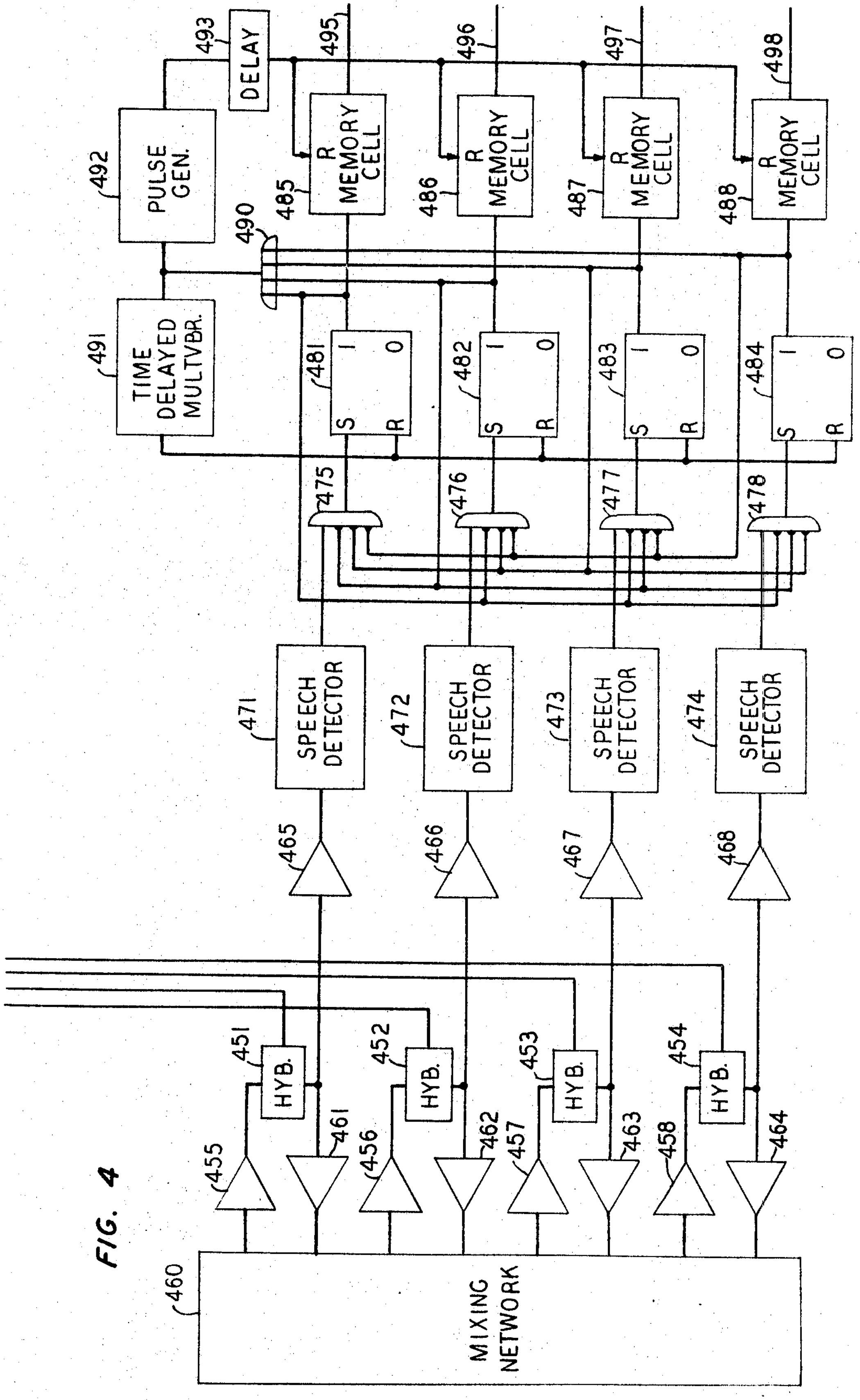

Transistor 506 in conduction corresponds to the situation in which the speaker in location 2 has assumed control of the logical circuitry shown in FIG. 4. With transistor 506 in conduction a ground is provided to the anodes of diodes 515 and 518. If either of the relays 5A2 or 5B2 had been in conduction prior to the energizing of transistor 506, its normally open contacts 5A2–3 and 5B2–5 respectively, will remain closed for a sufficient duration in time to permit the relay to continue to be energized through the path provided by transistor 506. If, however, neither one of the relays 5A2 or 5B2 had been energized, its corresponding contact will not be closed and therefore transistor 506 will not energize it for the first time. Hence, relays 5A2 and 5B2 will remain in whatever state they were in prior to the energizing of transistor 506. In FIG. 3 it can be seen that relays 5A2 and 5B2 control contacts in video switch 207 which determines the video signal to be presented to video receiver 202 in location 2. Hence, operation of transistor 506 will cause the same video signal to be continued to be presented to the video receiver in location 2. In addition, operation of transistor 506 causes relay 5B1 to be energized through normally closed contact 2MSA1–3 and diode 513, relay 5B3 to be operated by the path provided through normally closed contact 2MSA3-3 and diode 523, and relay 5B4 to be operated by the path provided through normally closed contact 3MSA4–3 and diode 528. In FIG. 2 it can be seen that with relay 5B1 operated and relay 5A1 not operated, video receiver in location 1 is connected by way of transmission path 111 through normally closed contacts 5A1–1 and normally open contact 5B1–2 to transmission path 206 containing the video signal generated in location 2. Similarly, operation of relay 5B3 with relay 5A3 not operated causes the video receiver in location 3 to be connected through normally closed contact 5A3–1 and normally open contact 5B3–2 to the transmission path 206 containing the video signal generated by the camera in location 2. And, finally, the operation of relay 5B4 with relay 5A4 not operated causes the video receiver in location 4 to be connected by way of transmission path 411 through normally closed contact 5A4–1 and normally open contact 5B4–2 to transmission path 206 again containing the video signals generated by the camera in location 2.

In summary, conduction of transistor 506 causes video receiver 202 in location 202 to remain connected to whatever video signal it had been connected prior to conduction, and in addition, causes each of the other receivers to be connected through to the video signal generated by the camera in location 2.

Transistor 507 in conduction corresponds to the situation where the speaker in location 3 has assumed control of the logical network shown in FIG. 4. With transistor 507 in conduction relays 5A3 and 5B3 will be energized through diodes 520 and 522 only providing each relay had been energized prior to the conduction of transistor 507 since each relay is connected to the cathode of its respective diode through one of its normally open contacts. Hence, relays 5A3 and 5B3 will be maintained in their prior state when transistor 507 is driven into conduction. The contacts of relays 5A3 and 5B3 which form video switch 307 for connecting the video receiver 302 in location 3 through to one of the transmission paths 106, 206 or 406 will be maintained in whatever state they had prior to the conduction of transistor 507. Accordingly, video receiver 302 in location 3 will continue to observe the same video signal which it had been observing prior to the conduction of transistor 507.

Conduction of transistor 507 does cause relay 5A1 to be energized through normally closed contact 2MSA1–1 and diode 510, relay 5A2 to be energized through normally closed contact 3MSA2–1 and diode 516, relay 5A4 to be energized through three normally closed contacts 3MSA4–1 and diode 526. The operation of relay 5A1 with relay 5B1 not operated causes video receiver 102 in location 1 to be connected by way of transmission path 111 through normally open contact 5A1–2 and normally closed contact 5B1–3 to transmission path 305 containing the video signal generated by the camera in location 3. Operation of relay 5A2 with relay 5B2 not operated causes video receiver 202 in location 2 to be connected by way of transmission path 211 through normally open contact 5A2–2 and normally closed contact 5B2–3 to transmission path 306 containing the video signal generated in location 3. And, finally, the operation of relay 5A4 with relay 5B4 not operated causes the video receiver 402 in location 4 to be connected by way of transmission path 411 through normally open contact 5A4–2 and normally closed contact 5B4–3 through to transmission path 306 containing the video signal generated in location 3.

Transistor 508 in conduction corresponds to the situation where the speaker in location 4 has assumed control of the logical network shown in FIG. 4. If relays 5A4 and 5B4 had been energized prior to the conduction of transistor 508 their respective relay contacts 5A4–3 and 5B4–5 will have been closed and therefore a path will have been provided between the one side of the relay coils through their respective diodes 525 and 527 to the collector of transistor 508. Hence, with the conduction of transistor 508 relays 5A4 and 5B4 will be maintained in whatever state of energization existed prior to the conduction of transistor 508. In addition, transistor 508 causes the operation of relay 5A1, relay 5B1, relay 5A2, relay 5B2, relay 5A3 and relay 5B3 through the paths shown in FIG. 5 containing diodes 511, 514, 517, 519, 521 and 524 respectively. Operation of both relays 5A1 and 5B1 causes video receiver 102 in location 1 to be connected by way of transmission path 111 through normally open contacts 5A1–2 and normally open contacts 5B1–4 through to transmission path 406 containing the video signal generated in location 4. Operation of relays 5A2 and 5B2 cause the video receiver 202 in location 2 to be connected by way of transmission path 211 through normally open contacts 5A2–2 and 5B2–4 through to transmission path 406 containing the video signal generated in location 4. Similarly, operation of relays 5A3 and 5B3 cause the video receiver 302 in location 3 to be connected by way of transmission path 311 through normally open contacts 5A3–2 and 5B3–4 to the transmission path 406 containing the video signal generated in location 4.

In summary, operation of any one of the transistors 505 through 508 in FIG. 5 causes the video switch corresponding to the location represented by that particular transistor to maintain whatever path existed prior to energizing the transistor and in addition causes each of the other video switches associated with the other locations to connect their respective video receivers to the video signal generated by the camera in the location corresponding to that particular transistor.

As indicated hereinabove in connection with FIG. 1, the automatic operation thus far described in connection with FIGS. 2 through 5 is not always desirable and therefore some means of manually controlling the video switch associated with any one location has been advantageously provided in accordance with the present invention. To achieve this manual control of the video switches each of the four locations, 1, 2, 3 and 4, has a manual selection device 104, 204, 304 and 404 respectively. Each of these devices is identical in construction and therefore the schematic diagram given in FIG. 6 of manual selection device 104 in location 1 will readily provide an understanding of the operation of all four manual selection devices. Each of the devices has four pushbutton switches of the type found in the standard multiline telephone subset wherein the pushbuttom switches are mechanically interconnected in a way so as to insure that only one switch may be depressed during any given instant.

Figure 6:
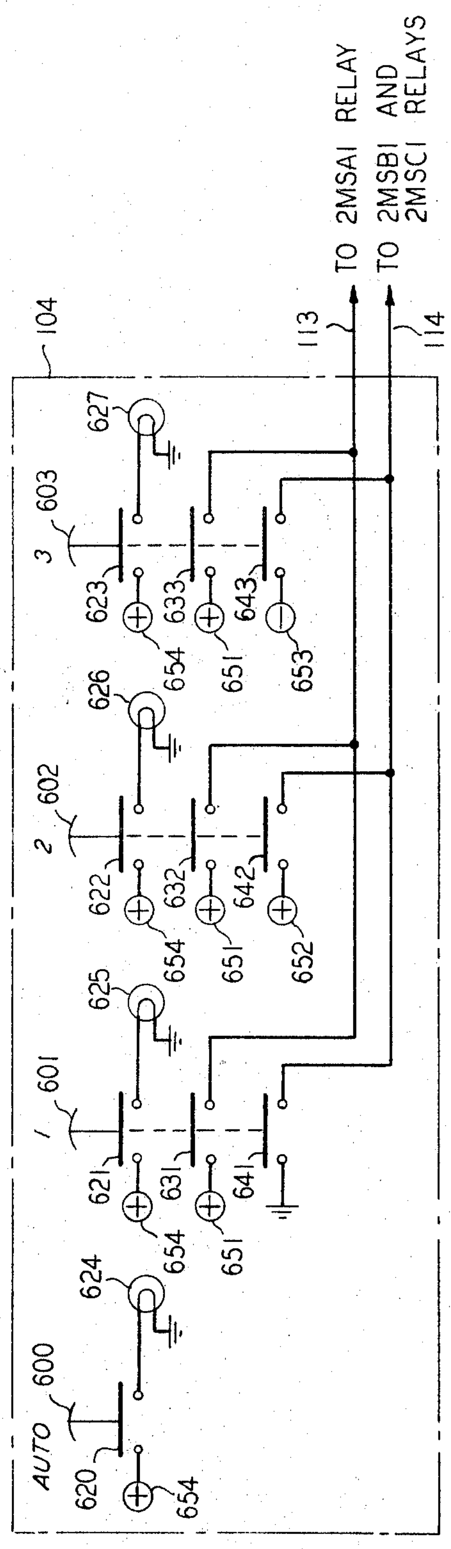
FIG. 6 is a schematic diagram of apparatus shown as blocks in FIGS. 1, 2 and 3.

In the schematic diagram of manual selection device 104 shown in FIG. 6, depression of button 600, designated on the manual selection device as "Automatic Control," simply connects positive potential source 654 through the switch 620 to a light 624 which illuminates the automatic control button, thereby indicationg that operation in accordance with the automatic video switch control 450 is presently in use.

Depression of button 601 illuminates a light 625 by the positive potential 654 provided through contact 621, causes a positive potential from source 651 to be provided to line 113 through switch contact 631, and in addition causes ground potential to be provided to line 114 through contact 641. Depression of button 602 causes light 626 to be illuminated by the potential from source 654 through contact 622, causes positive potential 651 to be connected to line 113 through contact 632, and an addition, causes a positive potential from positive potential 652 to be connected to line 114 through contact 642. Depression of button 603 illuminates light 627 by the potential provided from source 654 through contact 623, causes a positive potential from source 651 to be provided to line 113 through contact 633, and in addition, causes a negative potential from source 653 to be provided to line 114 through contact 643. In summary, depression of the automatic button 600 in any one of the locations provides no potentials to either of the lines 113 or 114. Depression of the button 601 in any one of the manual selection devices provides a positive potential to line 113 and ground potential to line 114. Depression of button 602 provides a positive potential to line 113 and a positive potential to line 114. Depression of button 603 provides a positive potential to line 113 and a negative potential to line 114.

Since lines 113, 213, 313 and 413 are each directly connected to a relay in the central location 500, as shown in FIGS. 2 and 3, this relay will be energized when a potential is provided on the corresponding line, i.e., when any one of the three buttons other than the automatic button is depressed in the corresponding manual selection device. These relays are shown in FIGS. 2 and 3 for locations 1, 2, 3 and 4 as relays 2MSA1, 3MSA2, 2MSA3, and 3MSA4 respectively. Operation of any one of these relays by depressing any one of the buttons in its corresponding manual selection device other than the automatic button, causes the coils of the 5A and 5B relays in FIG. 5 corresponding to the individual location to be disconnected from the control provided by transistors 505 through 508 in FIG. 5 and instead to be connected to relay contacts which are under the control of relays designated in FIG. 2 and FIG. 3 as the MSB and MSC relays. For example, operation of the 2MSA1 relay in FIG. 2 causes normally closed contact 2MSA1–1 in FIG. 5 to open and thereby disconnect relay 5A1 from the diodes 509 through 511 and instead connect relay 5A1 through normally open contact 2MSA1–2 to the parallel combination of contacts 2MSB1–1 and 2MSC1–1. Similarly, operation of 2MSA1 causes normally closed contacts 2MSA1–3 in FIG. 5 to be opened, thereby disconnecting relay 5B1 from diodes 512 through 514 and instead connecting relay 5B1 through contact 2MSA1–4 to contact 2MSB1–2. The other relay coils which control the operation of the video switches in the locations other than location 1 are similarly disconnected from control by transistors 505 through 508 and instead connected to control by contacts belonging to 3MSB, 3MSC, 2MSB and 2MSC relays. As indicated in FIG. 5, control of relays 5A2 and 5B2 is transferred by the operation of relay 3MSA2, control of relays 5A3 and 5B3 is transferred by the operation of relay 2MSA3, and control of relays 5A4 and 5B4 is transferred by the operation of relay 3MSA4.

With button 601 of manual selection device 104 depressed, a ground potential is presented on line 114 to relays 2MSB1 and 2MSC1. Accordingly, neither one of these relays will operate. Consequently, even though relay coil 5A1 in FIG. 5 is disconnected from the automatic control provided by diodes 509 through 511 and instead connected through contact 2MSA1–2 to normally open contacts 2MSB1–1 and 2MSC1–1, relay coil 5A1 will not be operated when button 601 of manual selection device 104 is depressed. With button 601 depressed, relay 5B1 is connected through 2MSA1–4 and normally closed contact 2MSB1–2 to ground. Accordingly, with button 601 of manual selection device 104 depressed, relay 5A1 is not operated and relay 5B1 is operated, and therefore video receiver 102 is connected through normally closed contact 5A1–1 and normally open contact 5B1–2 to transmission path 206 containing the video signals generated in location 2.

With the second button 602 of manual selection device 104 depressed, relay 2MSA1 is operated and in addition a positive potential is supplied by way of line 114 to the junction of diodes 115 and 116. Diode 116 will be back biased by the positive potential on line 114 and therefore relay 2MSC1 will remain unoperated, but the positive potential on line 114 will forward bias diode 115, thereby causing relay 2MSB1 to be operated. With relay 2MSA1 operated and relay 2MSB1 operated, relay coil 5A1 in FIG. 5 will be energized through the path provided by contacts 2MSA1–2 and 2MSB1–1. Relay 5B1, however, will be unoperated since its energizing path will be opened by normally closed contacts 2MSB1–2. With relay coil 5A1 operated and relay coil 5B1 unoperated, video receiver 102 is connected by way of transmission path 111 through contact 5A1–2 and normally closed contact 5B1–3 to transmission path 306 containing the video signal generated in location 3. With the third button 603 of manual selection device 104 depressed, relay 2MSA1 will again be energized by the positive potential on line 113, and a negative potential will be supplied on line 114 to the junction of diodes 115 and 116. This negative potential will now back bias diode 115, thereby not permitting the operation of relay 2MSB1, but will forward bias diode 116, thereby causing relay 2MSC1 to be operated. With relay 2MSC1 operated and relay 2MSB1 unoperated relay 5A1 will be operated by the path provided in FIG. 5 through 2MSA1–2 and 2MSC1–1. Relay coil 5B1 will also be operated by the path provided through contact 2MSA1–4 and 2MSB1–2. With both relay coils 5A1 and 5B1 operated, video receiver 102 will be connected by way of transmission path 111 through contact 5A1–2 and contact 5B1–4 to transmission path 406 containing the video signal generated in location 4.

In summary, for manual selection device 104 in location 1, depressing automatic button 600 causes none of the relays 2MSA1, 2MSB1, or 2MSC1 to be operated and therefore video switch 107, controlled by relays 5A1 and 5B1, remains under the control of transistors 505 through 508. Depressing the first button 601, however, causes 2MSA1 to be operated thereby disconnecting the relays 5A1 and 5B1 from the control of transistors 505 and 508, and in addition causes video switch 107 to connect video receiver 102 to the video signal from the camera in location 2. Depressing the second button 602 again causes the operation of relay 2MSA1, and in addition, operates relay 2MSB1, thereby causing video receiver 102 to be connected through its video switch to the video signal from the camera in location 3. Depressing the third button 603 causes relay 2MSA1 and relay 2MSC1 to be operated, thereby causing video receiver 102 to be connected through the video switch to the video signal from the camera in location 4.

In all of the other locations 2, 3 and 4, the manual selection devices 204, 304 and 404 respectively will operate their corresponding MSA, MSB and MSC relays in an identical fashion to that of manual selection device 104. Their corresponding 5A and 5B relays in FIG. 5, however, will operate in a different fashion since the 5A and 5B relay coils in FIG. 5 for each of the other locations are connected through a different arrangement of contacts under the control of their respective MSB and MSC relays. For example, with the first button of manual selection device 204 depressed, relay 3MSA2 will be operated and relays 3MSB2 and 3MSC2 will not be operated. Accordingly, relays 5A2 and 5B2, although disconnected by relay 3MSA2 from control by transistors 505 through 508 will not be energized since no path is provided through the contacts of either the 3MSB2 or 3MSC2 relays. With neither 5A2 nor 5B2 operated, video receiver 202 is connected through contact 5A2–1 and contact 5B2–1 to transmission path 106 containing the video signal generated in location 1. With the second button of manual selection device 204 depressed, thereby causing operation of relays 3MSA2 and 3MSB2, relay 5A2 will be operated through contact 3MSB2–1 but relay 5B2 will not be operated. With relay 5A2 operated and relay 5B2 unoperated video receiver 202 is connected by way of transmission path 211 through contact 5A2–2 and contact 5B2–3 to transmission path 306 containing the video signal generated in location 3. With the third button of manual selection device 204 depressed, relay 3MSA2 and relay 3MSC2 are operated, thereby causing the operation of both relay 5A2 through contact 3MSC2–1 and relay 5B2 through contact 3MSC2–2. With relays 5A2 and 5B2 operated, video receiver 202 is connected by way of transmission path 211 through contact 5A2–2 and contact 5B2–4 to transmission path 406 containing the video signal generated in location 4.

With the first button of manual selection device 304 in location 3 depressed, relay 2MSA3 will be operated but relays 2MSB3 and 2MSC3 will not be operated, thereby causing neither of relays 5A3 or 5B3 to be operated. Accordingly, video receiver 302 will be connected through contact 5A3–1 and contact 5B3–1 to transmission path 106 containing the video signal generated in location 1. With the second button of manual selection device 304 depressed, relay 2MSA3 and relay 2MSB3 will be operated, thereby causing operation of relay 5B3 only. With 5A3 not operated and relay 5B3 operated, video receiver 302 will be connected through contact 5A3–1 and contact 5B3–2 to transmission path 206 containing the video signal generated in location 2. With the third button of manual selection device 304 depressed, relays 2MSA3 and 2MSC3 will be operated, thereby causing the operation of relay 5A3 through contact 2MSC3–1 and the operation of relay 5B3 through contact 2MSC3–2. Accordingly, video receiver 302 will be connected by way of transmission path 311 through contact 5A3–2 and contact 5B3–4 to transmission path 406 containing the video signal generated in location 4.

With the first button of manual selection device 404 in location 4 depressed, relay 3MSA4 will be operated but relays 3MSB4 and 3MSC4 will not be operated. Accordingly, neither of the relays 5A4 or 5B4 will be operated and therefore video receiver 402 will be connected through normally closed contact 5A4–1 and normally closed contact 5B4–1 to transmission path 106 containing the video signal generated in location 1. With the second button of manual selection device 404 depressed, relays 3MSA4 and 3MSB4 are operated, thereby causing the operation of relay 5B4 only, through contact 3MSB4–1. With relay 5A4 unoperated and relay 5B4 operated, video receiver 402 is connected through contact 5A4–1 and contact 5B4–2 through to transmission path 206 containing the video signal generated in location 2. With the third button of manual selection device 404 depressed, relays 3MSA4 and 3MSC4 are operated, thereby causing the operation of relay 5A4 only, through contact 3MSC4–1. With relay 5A4 operated and relay 5B4 unoperated, video receiver 402 is connected through contact 5A4–2 and normally closed contact 5B4–3 to transmission path 306 containing the video signal generated in location 3.

What is claimed is:

1. In apparatus for distributing video signals generated in at least three remote locations to video receivers at the remote locations where each of such locations also generates a speech signal when speech is present at the location, means for selecting one location of said at least three remote locations in response to the detection of the presence of a speech signal from one of said locations, and means responsive to said selecting means for connecting the video signal from said one location to the video receivers at all remote locations except said one location.

2. Apparatues as defined in claim 1 wherein the means for connecting the video signal is separable into several parts equal in number to the number of remote locations, each part of which video signal connecting means controls the video signal to be transmitted to a video receiver in one of the remote locations, means in each remote location for generating a pair of control signals, means responsive to one of said pair of control signals for disconnecting the corresponding part of said video signal connecting means from control by said detecting means, and means for controlling said part of said video signal connecting means in response to the second of said pair of control signals, whereby the video signal received by the video receiver in a remote location is determined by said pair of control signals irrespective of which one of the remote locations is generating a speech signal.

3. Apparatus for distributing video signals originating at N remote locations to video receivers at said remote locations where N is an integer greater than 2, each of such locations also containing apparatus for generating a speech signal when speech is present at the location, a plurality of video switching means equal in number to the number of remote locations, each of said switching means having (N—1) inputs and a single output and being responsive to control signal for selectively connecting its output through to a single input, means for connecting the output of each switching means to the video receiver in a corresponding one of said locations, means for connecting the video signal generated in each of the locations other than said one location to one of said inputs of said each switching means, means responsive to a speech signal generated in any one of said locations for providing control signals to the video switching means associated with the other remote locations, whereby the operation of the speech responsive means for providing control signals is such that the video receivers in all locations except the one generating said speech signal are connected by way of their corresponding video switching means to the video signal generated in said one speech-generating location, the video receiver in the location generating said speech signal being unchanged in its connection to a video signal from one of the other remote locations.

4. Apparatus as defined in claim 3 wherein each remote location contains means for generating a pair of control signals, means for disconnecting the control signal provided by said speech responsive means from the control input of one video switching means in response to one of said pair of control signals from the location corresponding to said one video switching means, and means for applying the second of said pair of control signals to the control input of said one video switching means, whereby the video signal transmitted to the video receiver in said one location is determined by said pair of control signals irrespective of which location is generating a speech signal.

5. Apparatus for distributing video signals generated in N remote locations where N is an integer greater than 2 to video receivers in said remote locations each one of which also contains apparatus for generating a speech signal when speech is present at the location, a plurality of video switching means each one of which selectively connects the video receiver in each of said N remote locations to a video signal generated in one of the other (N—1) remote locations, each video switch being under the control of a signal applied to its control input, and means for generating control signals for said video switching means in response to the speech signal at any one of said N locations.

6. In apparatus for distributing video signals generated at several remote locations to video receivers in each of said remote locations where each of such locations also includes means which generates a speech signal when speech is present at that location, a plurality of video switching means each of which is associated with a particular remote location and has a control input, an output, and several inputs equal in number to one less than the number of remote locations, each of said video switching means being operative in response to a signal at its control input for connecting its output through to one of said several inputs, means for connecting each video receiver in each of said remote locations to the output of its corresponding video switching means, means for connecting the video signal generated at each of said several remote locations to one of said several inputs of all of said plurality of video switching means except the switching means associated with the generated video signal, and means associated with each video switching means for controlling the latter in response to a control signal from the remote location corresponding to said each video switching means.

7. In apparatus for distributing video signals generated at several remote locations to video receivers in each of said remote locations where each of such locations also includes means which generates a speech signal when speech is present at that location, a plurality of video switching means each of which is associated with a particular remote location and has a control input, an output, and several inputs equal in number to one less than the number of remote locations, each of said video switching means being operative in response to a signal at its control input for connecting its output through to one of said several inputs, means for connecting each video receiver in each of said remote locations to the output of its corresponding video switching means, means for connecting the video signal generated at each of said several remote locations to one of said several inputs of all of said plurality of video switching means except the switching means associated with the generated video signal, and means connected to the control input of all video switching means for generating control signals in response to the speech signals generated in said remote locations.

8. Apparatus for distributing the video signals generated in remote locations by visual telephone sets each of which also contains a video receiver, a speakerphone and a manual selection device, said apparatus comprising a plurality of video switching means each one of which is associated with a particular remote location and has an output, several inputs equal at least in number to one less than the number of remote locations, and a control input which responds to control signals presented thereto by connecting said output to one of said several inputs, means for connecting the video signal generated in each one of said remote locations to one of said several inputs of all of said video switching means except the one associated with the location which is generating said video signal, means for connecting the output of each video switching means to its associated video receiver, a plurality of speech detecting means each one of which is associated with a particular remote location and produces an output signal in response to a speech signal presented to its input, means connecting each speech detecting means to the speakerphone in its corresponding location, and means responsive to an output signal from one of said plurality of speech detecting means for generating control signals for each control input of said plurality of video switching means, whereby the video switching means for all remote locations except the one location corresponding to the speech detecting means which generated said output signal operate to connect its associated video receiver to the video signal from said one location.

9. Apparatus as defined in claim 8 wherein said means for generating control signals includes a plurality of memory means each one of which is associated with one of said plurality of speech detecting means and is capable of reading and storing either one of two potentials presented to its input, gating means responsive to an output signal from one of said plurality of speech detecting means for storing the first of said two potentials in the memory means corresponding to said one speech detecting means and the second of said two potentials in the other memory means, and means for generating said control signals in response to the potentials stored in said plurality of memory means.

10. Apparatus as defined in claim 9 wherein said control signals generating means further includes means connected to the input of each memory means for inhibiting the operation of said gating means for a predetermined interval after an output signal from one of said plurality of speech detectors.

11. In a system for interconnecting at least three visual telephone sets each of which has a video receiver and generates a continuous video signal and a speech signal when speech is present at the visual telephone set location, a plurality of video switching means each of which is associated with one of said visual telephone sets and has an output and several inputs equal at least in number to one less than the number of visual telephone sets, each of said video switching means being responsive to a control signal whereby one of said several inputs is connected through to said output, means for connecting the video signal from each visual telephone set to one of said several inputs of each of said plurality of video switching means except the video switching means corresponding to said each visual telephone set, means for generating the control signal for each of said video switching means, said control signal generating means comprising a plurality of speech detecting means each of which is associated with one of said visual telephone sets and produces an output voltage pulse in response to a speech signal from its corresponding visual telephone set, a plurality of bistable devices each of which is associated with one of said video switching means and is set to one of its bistable states in response to a voltage pulse at its input, gating means for coupling the voltage pulse from each video switching means to the input of its corresponding bistable device, means responsive to a change in one of said bistable devices for inhibiting the gating means associated with the other of said bistable devices, means for resetting each of said plurality of bistable devices to the other of its bistable states a predetermined interval after one of said bistable devices has been set to said one of its bistable states, a plurality of memory means each one of which is associated with one of said bistable devices, means responsive to the setting of any one of said bistable devices for causing each memory means to read and store the state of its corresponding bistable device, and means responsive to the stored states in said plurality of memory means for generating the control signal for each of said video switching means.

References Cited

UNITED STATES PATENTS 3,026,374 3/1962 Hilliard -------------- 179—1
3,352,966 11/1967 Sawazaki ------------- 178—6

RALPH D. BLAKESLEE, Primary Examiner

U.S. Cl. X.R.

179—18.01